United States Patent [19]

Stark

[11] Patent Number: 4,896,732
[45] Date of Patent: Jan. 30, 1990

[54] FOLDABLE FRAME FOR AGRICULTURAL ROLLERS

[76] Inventor: Crister K. G. Stark, Axtavägen, S-59600 Skänninge, Sweden

[21] Appl. No.: 346,927
[22] PCT Filed: Nov. 20, 1987
[86] PCT No.: PCT/SE87/00547
§ 371 Date: Apr. 19, 1989
§ 102(e) Date: Apr. 19, 1989
[87] PCT Pub. No.: WO88/04134
PCT Pub. Date: Jun. 16, 1988

[30] Foreign Application Priority Data

Dec. 5, 1986 [SE] Sweden .............................. 8605233

[51] Int. Cl.$^4$ ..................... A01B 73/06; A01B 29/00
[52] U.S. Cl. ................................ 172/311; 172/456; 172/662
[58] Field of Search ............... 172/310, 311, 316, 452, 172/456, 481, 537, 626, 662

[56] References Cited

U.S. PATENT DOCUMENTS

| | | | |
|---|---|---|---|
| 3,548,954 | 12/1970 | Lindemann | 172/456 X |
| 3,700,040 | 10/1972 | Sosalla et al. | 172/456 X |
| 3,841,412 | 10/1974 | Sosalla | 172/456 X |
| 3,990,521 | 11/1976 | Ankenman et al. | 172/456 X |
| 4,223,742 | 9/1980 | Stark | 172/456 |
| 4,318,444 | 3/1982 | Hake | 172/456 |
| 4,418,762 | 12/1983 | Page | 172/311 |
| 4,821,809 | 4/1989 | Summach et al. | 172/311 X |

Primary Examiner—Randolph A. Reese
Assistant Examiner—Jeffrey L. Thompson
Attorney, Agent, or Firm—Dowell & Dowell

[57] ABSTRACT

An agricultural roller has two or more pivotably connected sections arranged side by side. A central frame has a towing bar pivotably connected to the central frame. The roller has roller sections (4, 6) on either side of the central frame (8) and transport wheels (15, 16), which are settable between an inactive position above the ground in the work position of the roller and a transport position where the roller means are lifted up from the ground and swung towards each other to achieve a small transport width. The two side sections (4, 6) situated closest the central frame (8) carry the transport wheels connected to the section frames, and between the sections there are pivot joints (17, 18) implemented such that the sections can adjust themselves to irregularities in the ground in the working position of the roller. A hydraulic cylinder (21) is arranged between the towing bar (2) and central frame (8), and can swing the central frame and the roller sections (4, 5, 6) connected thereto about 90° about a pivoting axis transverse the driving direction to an 'on edge' or intermediate position, where the roller rests on the transport wheels (15, 16). By driving the tractor forwards the side sections (4, 6) are caused to swing towards each other into the transport position.

7 Claims, 7 Drawing Sheets

FOLDABLE FRAME FOR AGRICULTURAL ROLLERS

The present invention relates to apparatus in agricultural rollers intended for soil cultivation, and including a) two or more sections pivotably connected to each other and arranged side by side, where a frame associated with a centrally situated section of the roller has a towing bar pivotably connected to this central frame for transport and towing after a tractor, b) roller sections with roller frames arranged on either side of the central frame, and carrying rotatable roller means for working the soil, and c) transport wheels which are settable between an inactive position above the ground in the work position of the roller and a transport position where the wheels support and carry the roller with the roller means lifted from the ground and pivoted towards each other so that a decreased transport width is obtained.

Agricultural roller of this type are known, inter alia from the Swedish Patents No. 7704263-8 (GB No. 1,593,573) and 7900384-4 (FR No. 8000871). These rollers are equipped with a hydraulic unit for pivoting the transport wheels between an inactive position and a transport position, there being a further hydraulic unit for pivoting the side sections between work position and transport position.

This means that extensive and costly operating means are required for handling the rollers in changing between work on a field and transport between different work places.

A very simple and cheap roller is achieved through the invention, although it has the many advantages of the known rollers mentioned in the introduction. This is achieved in an amazingly simple way by the distinguishing features disclosed in the claims.

The invention will now be described in more detail in connection with an exemplifying embodiment illustrated on the accompanying drawings, where.

Figure 1:
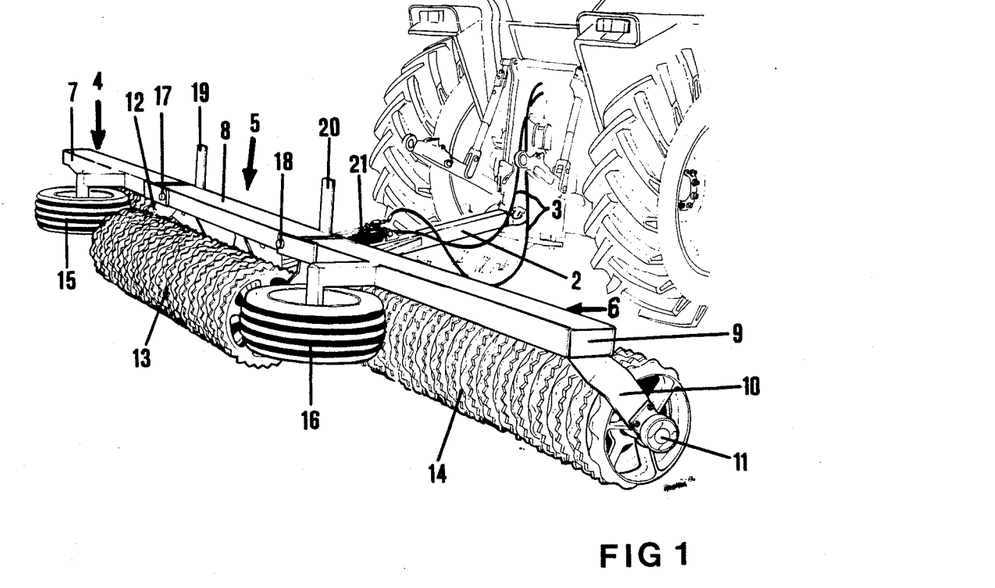
FIG. 1 illustrates in a perspective view seen obliquely from behind a roller pulled by a tractor when the roller is in its work position.

In FIG. 1, the numeral 1 denotes a tractor, with a towing means 2 pivotably connected to the central section 5 of the roller, while the numeral 3 denotes hydraulic lines to a hydraulic cylinder 21 arranged between the towing means 2 and the central section 5. The left hand side section of the roller is denoted by 4 and the right hand side section by 6. The frames for the sections 4, 5 and 6 are respectively denoted by 7, 8 and 9. There are carrying arms 10 at either end of the section frames, these arms carrying the ends of the shafts on which the rolling sets 12, 13 and 14 are mounted. The shaft ends are carried by the arms 10 in elastic mountings 11.

Transport wheels 15 and 16 are rotatably mounted on brackets extending backwards and downwards in FIG. 1 from the side frames 7 and 9 to which the brackets are rigidly attached.

Pivot pins 17 and 18 are also illustrated in FIG. 1, the pin 17 being the connection between left side section 4 and the central section 5 and the pin 18 being the connection between the right section 6 and the central section 5. The pins 17 and 18 enable the roller sections 4, 5 and 6 to adjust just themselves to irregularities in the ground. The elastic mountinqs 11 also contribute to this adjustment. Finally, the Figure illustrates two arms 19 and 20 which are rigidly attached and generally at right angles to the respective section frames 7 and 9. These two arms are adapted for co-action with detent means in a manner which will be described later.

Figure 2:
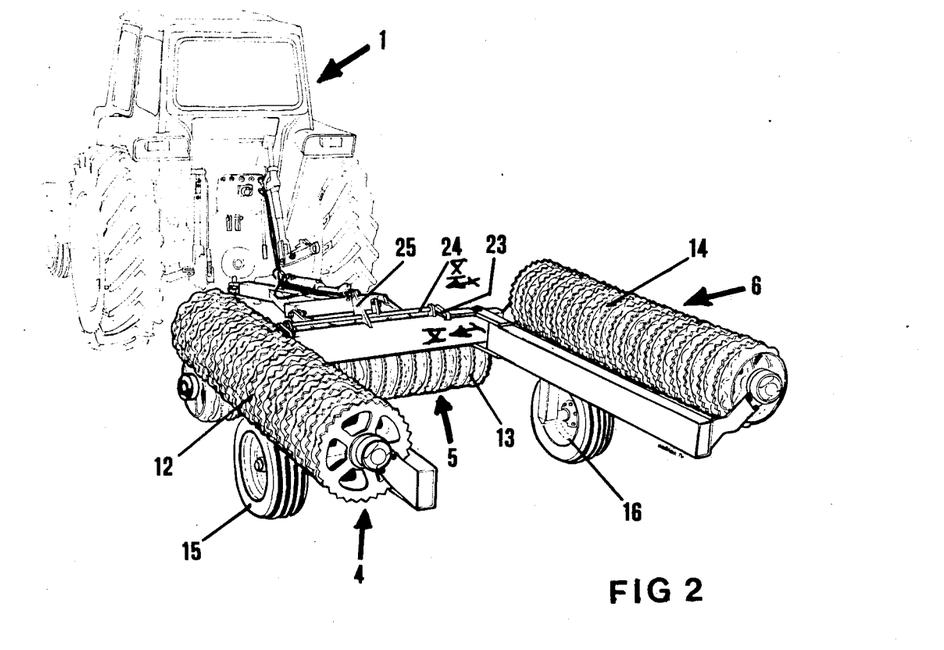
FIG. 2 is a perspective view with the roller in its transport position.

The appearance of the roller in its transport position will be seen from FIG. 2. The rolling sets 4, 5, 6 are lifted from the ground and the roller is carried by the transport wheels 15 and 16, as well as the towing means 2 connected to the towing hook of the tractor. Changing the roller from the work position in FIG. 1 to the transport position in FIG. 2 will be described later.

Two locking arms 22, 23 will also be seen from FIG. 2. These arms are adapted for engagement with the respective arm 19 and 20, and are connected to each other via a shaft 24. There are also denotations in FIG. 2 corresponding to those in FIG. 1.

Figure 3:
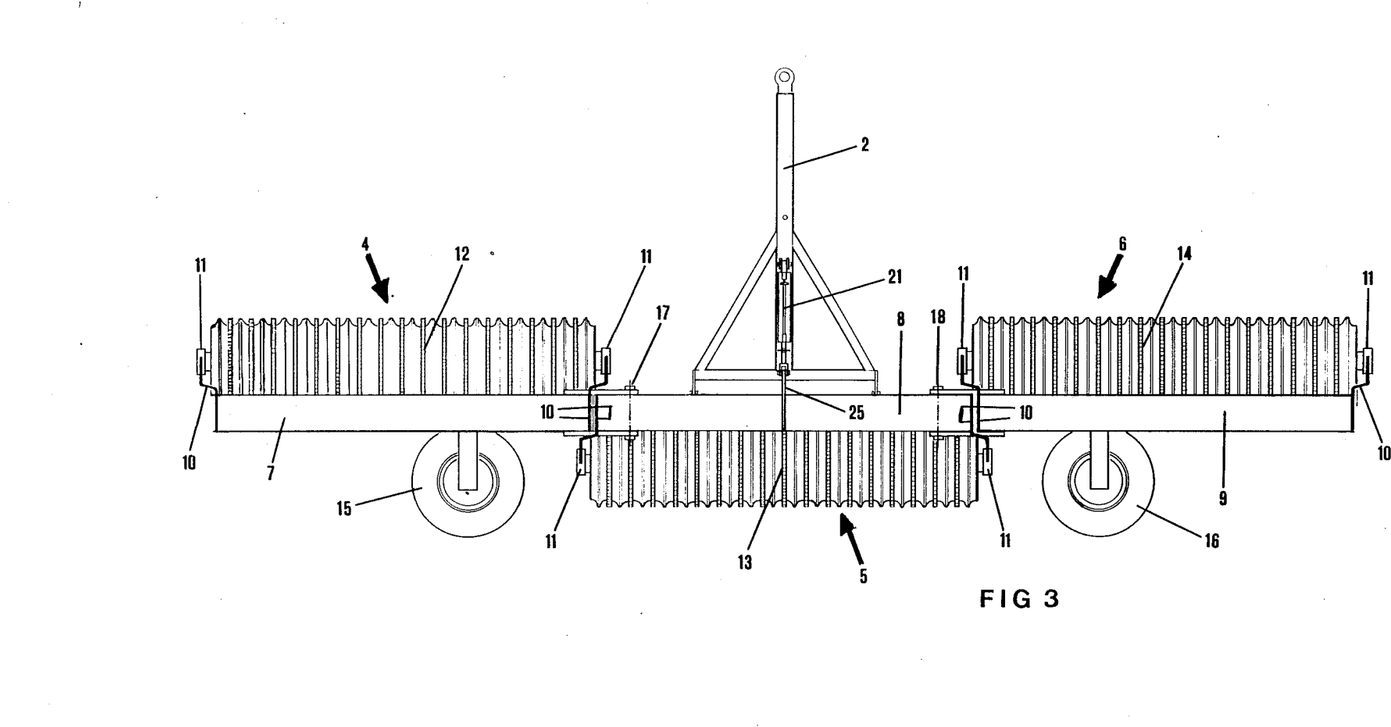
FIG. 3 illustrates the roller from above when it is in its work position.

FIG. 3 illustrates how the rolling sets 12-14 are placed in relation to each other in longitudinal and transverse directions for covering the whole of the ground area in the work position. It will be seen from the Figure that there is an operating arm 25 fixed to the frame 8 of the central section, this arm also being illustrated in FIG. 2. The hydraulic cylinder 21 is pivotably mounted at its ends to the towing means 2 and the operating arm 25.

Figure 4:
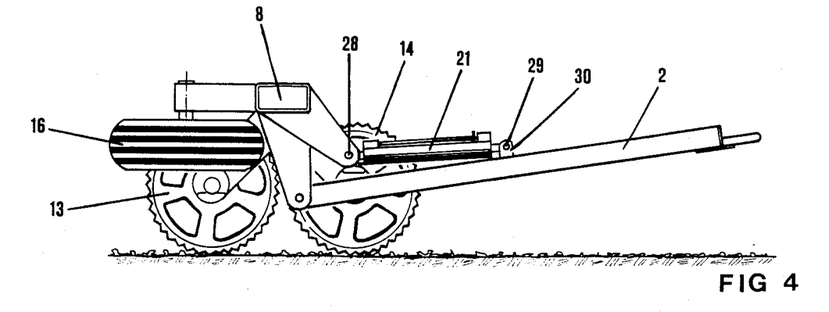
FIG. 4 is a side view of the roller in its work position.
Figure 5:
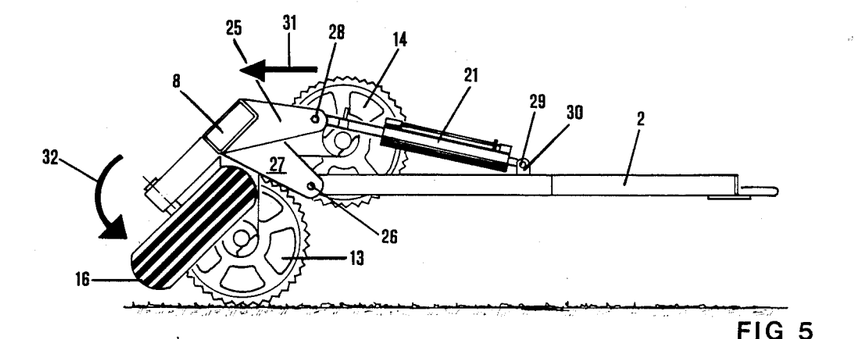
FIG. 5 is a corresponding side view of the roller when it is in an intermediate position between work position and transport position.
Figure 6:
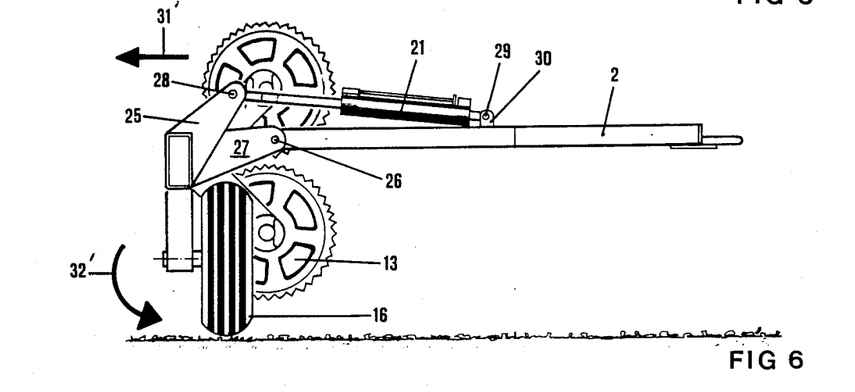
FIG. 6 is a side view of the roller in a position where the roller has been set down on its transport wheels.

Previously used denotations are to be found in the FIGS. 4–6. In addition, the numeral 26 denotes a pivoting pin between the towing means 2 and a bracket 27 rigidly attached to the frame 8 of the central section 5. There is a pivoting pin 28 connecting the operating arm 25 to the hydraulic cylinder 21 and a pivoting pin 29 for connecting the cylinder to a bracket 30 on the towing means 2.

In FIG. 4 the roller is in its work position with the rolling sets resting on the ground. By supplying hydraulic fluid to the hydraulic cylinder 21 the piston rod is thrust outward in a movement 31, resulting in that the rolling set 13 of the central section 5 is urged towards the ground while the rolling sets 12, 14 of both outer sections 4, 6 are lifted up from the ground by the whole roller being pivoted as illustrated by the arrow 32 in FIG. 5. The transport wheel 16 is on its way downwards towards the ground surface (as well as the wheel 15 lying behind it).

In the position illustrated in FIG. 6 the transport wheels 15 and 16 have come into engagement with the ground by the piston rod having been thrust out further 31' and by pivoting 32', such that the wheels now carry all the roller sections 4–6 which are lifted up free from the ground. The entire roller has now been turned into an "on edge" position by it having been swung about 90° from the work position.

Figure 7:
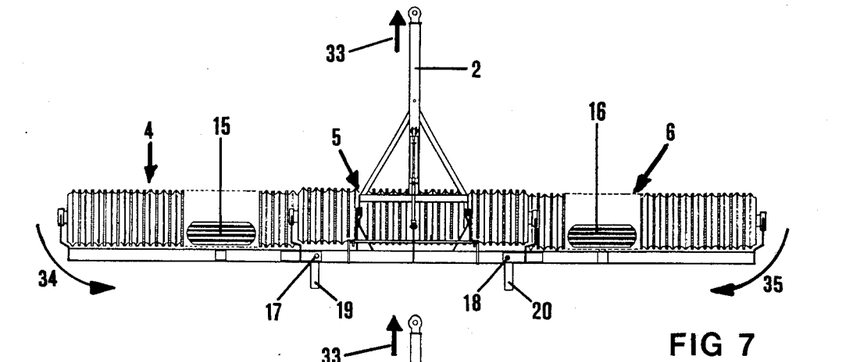
FIG. 7 is a view from above of the roller in the position illustrated in FIG. 6.

FIG. 7 illustrates the retracted roller, as seen from above. The transport wheels 15 and 16 are approximately transverse to the direction of travel and both pivoting pins 17 and 18 are approximately vertical. The arms 19 and 20 are directed backwards.

To bring the roller into its transport position the tractor is slowly driven forward, see the arrow 33. The central section 5 is moved forward via the towing means 2, while the side sections 4 and 6 are in turn pivoted in relation to the central section about both pivoting pins 17 and 18 and the transport wheels 15 and 16 such that the outer ends of the side sections begin to swing backwards according to the arrows designated 34 and 35.

Figure 8:
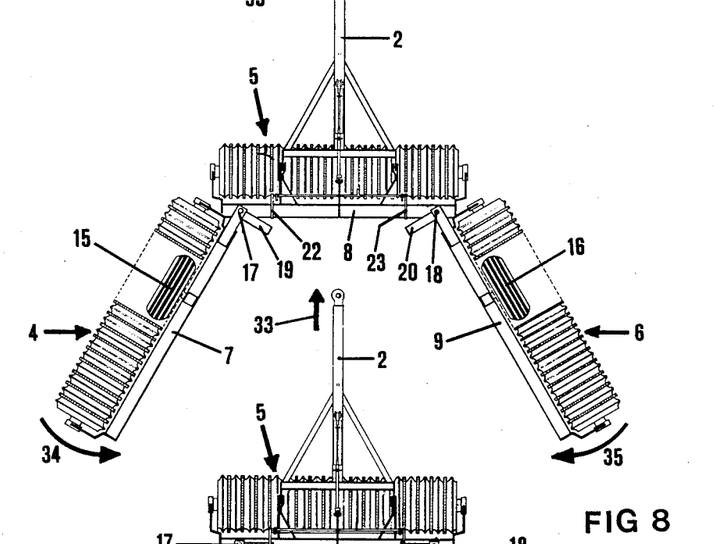
FIG. 8 is a corresponding view where the outer sections have been taken to an intermediate position for retraction to the transport position.

FIG. 8 illustrates the position of the roller sections when the tractor has moved forwards a further distance. The outer sections 4 and 6 have swung more backwards-inwards in the directions 34 and 35, while the transport wheels 15 and 16 have positioned themselves even more in the travelling direction. The arms 19 and 20 have approached their respective locking arms 22 and 23 on the frame 8 of the central section 5.

Figure 9:
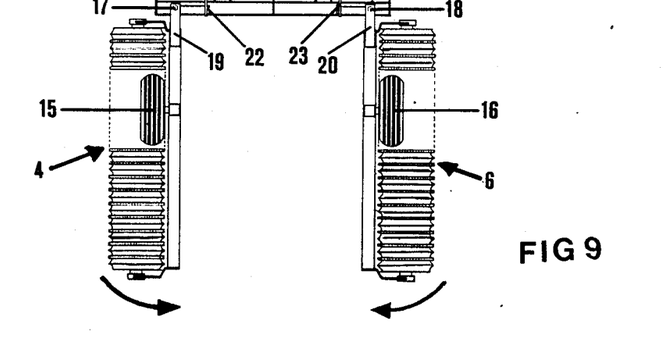
FIG. 9 is a view from above of the roller in its transport position.

For continued travel in the direction 33, the roller will assume its transport position, as illustrated in FIG. 9. The side sections are swung straight backwards and the transport wheels 15 and 16 have taken up their positions in the direction of travel. The locking arms 22 and 23 have engaged with the arms 19 and 20 to prevent the side sections from moving away from the position illustrated in FIG. 9. The roller is ready for transport, as illustrated in FIG. 2.

Figure 10:
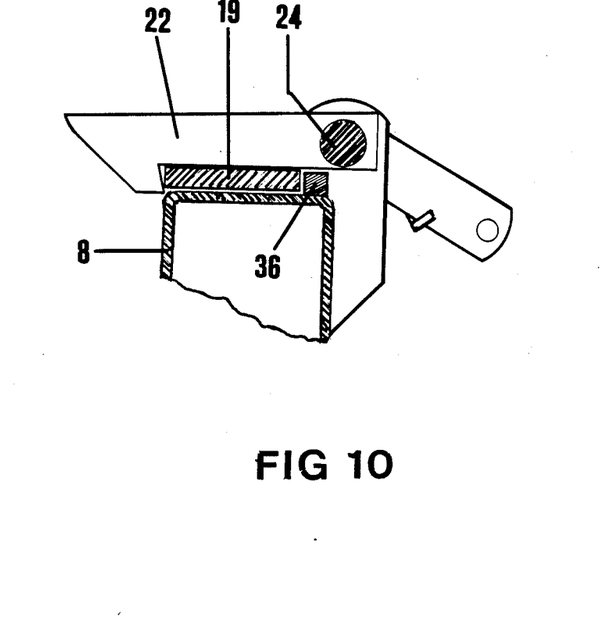
FIG. 10 is a view in the direction X—X in FIG. 2.

FIG. 10 illustrates in more detail the embodiment of the detent means for the side sections 4 and 6. In the Figure there are shown the means for the left hand roller section 4, the section frame 8, and stop 36 for the arm 19 and the locking arm 22 engaging the arm 19 for locking it in the blocked position. The shaft 24 connecting both locking arms 22 and 23 may be torsionally weak and springy so that the locking arms can engage with the arms 19 and 20 independent of each other. The locking arms can also be connected to the shaft 24 with a certain amount of play so that they can move independently of each other.

Figure 11:
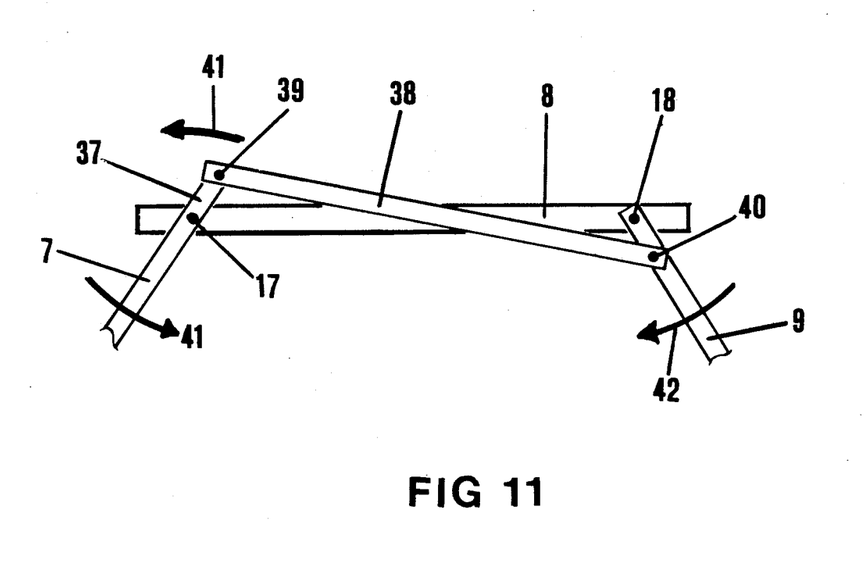
FIG. 11 is a view from above of a link connection between the side sections.

FIG. 11 illustrates a link means connecting the frames 7 and 9 of both side sections 4 and 6 to each other. The Figure corresponds to the position illustrated in FIG. 8, where the side sections are being folded towards each other into transport position. The left hand frame 7 has an extension 37, at the end of which there is a joint 39 for pivotable connection to a link 38. The other end of the link 38 has a joint 40 for pivotable connection to the right hand frame 9. The described arrangement results in that when the right hand frame 9 is swung in the direction of the arrow 42, the link 38 will be displaced towards the left, the joint 39 being displaced towards the left as well so that the left hand frame 7 swings in the direction of the arrows 41. As will be easily understood, both side sections will be moved in or out synchronously. This has the advantages that when the locking arms are to engage they do so simultaneously, and that outward or inward movement of the side sections takes place with good control when the tractor travels forwards or backwards.

Figure 12:
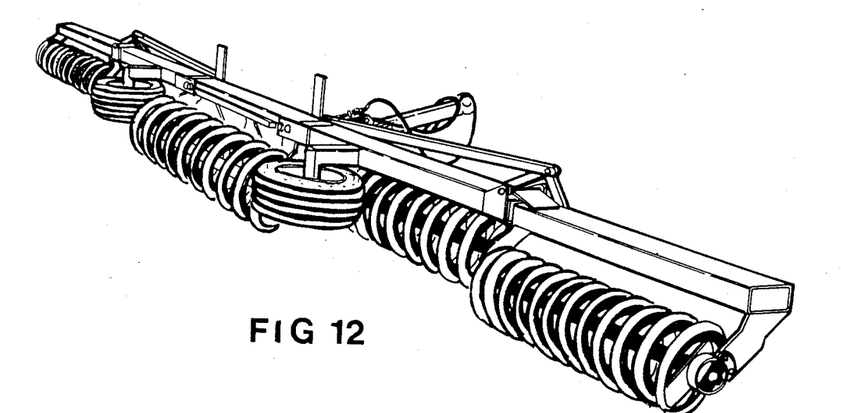
FIGS. 12, 13 and 14 illustrate a roller with helically shaped roller means arranged in three sections, which otherwise correspond to the roller described in FIGS. 1–12, FIGS. 15, 16 and 17 are different perspective views of a roller with five sections but otherwise corresponding to the roller described in FIGS. 1–12.
Figure 13:
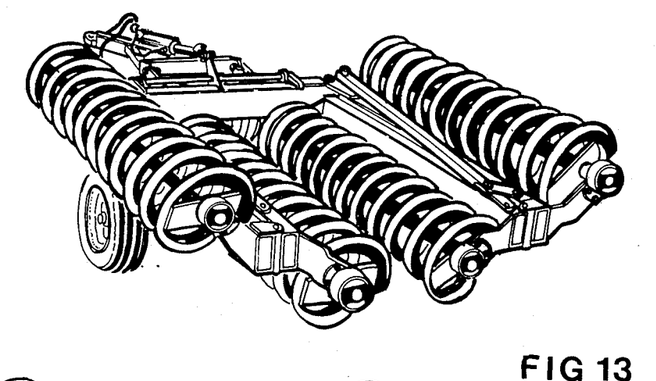
Figure 14:
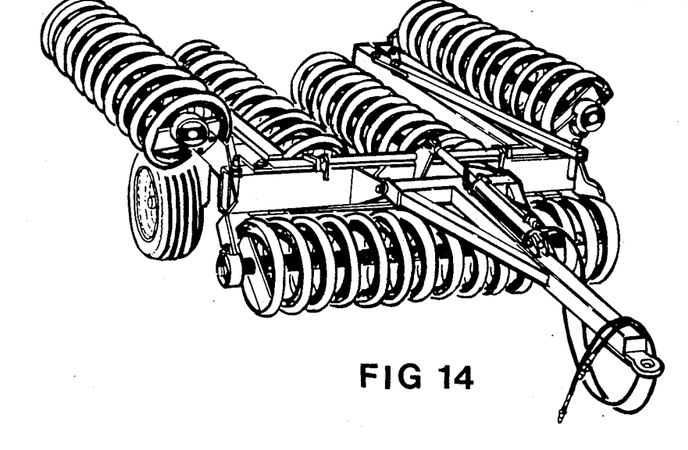

The FIGS. 12, 13 and 14 illustrate a roller with three sections. The rolling means here comprise helically shaped, rolled rods, which are suitable for certain soils. With regard to implementation of section frames, handling etc., the roller is entirely analogous with the three-section roller described above, where the rolling means comprises roller rings mounted on a shaft. It is obvious that other soil processing means arranged on section frames in mutual articulation can also apply the invention and the same advantages can be achieved.

Figure 15:
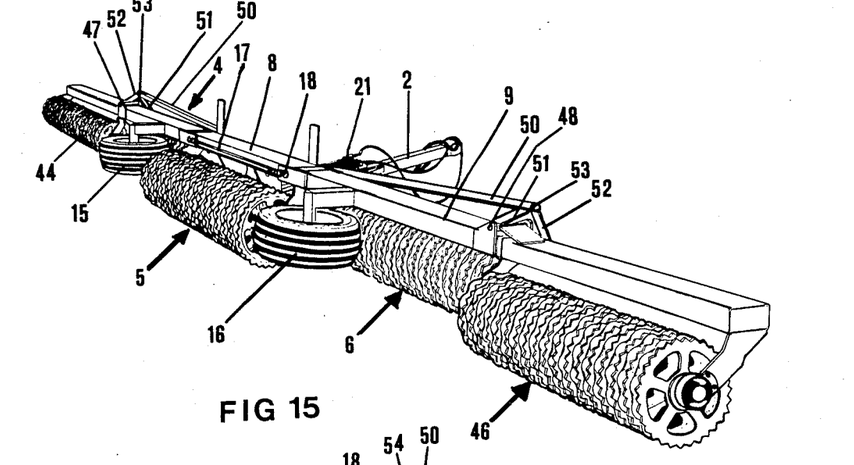
Figure 16:
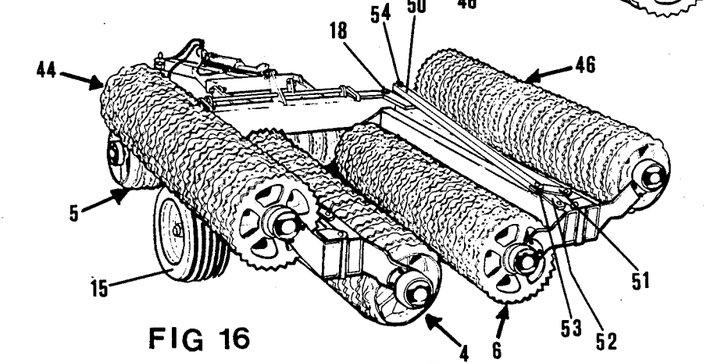
Figure 17:
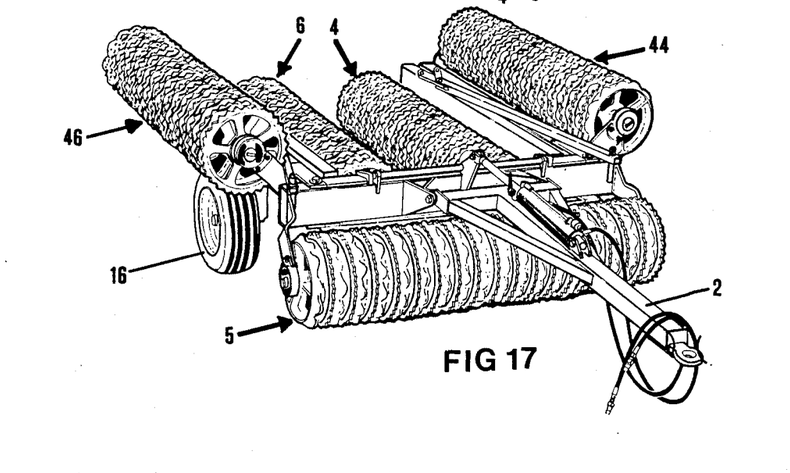

FIGS. 15, 16 and 17 illustrate a roller with five sections, equipped with roller rings and articulated to each other in the same way as described for the roller with three section according to FIGS. 1–11 above. The same denotations as in FIGS. 1–11 have been used for the three middle sections.

In the illustrated embodiment, an outer section 46 has been added on the right hand side of the roller, the frame and roller means of this section being the same as the other sections. The section 46 is pivotably connected to the section 6 by a joint 48 which is the same as the pivot joint 18. The five-section roller illustrated has transport wheels 15 and 16 on the side sections 4 and 6 situated adjacent the central section 5 in the same way as the described three-section roller.

In the same way as illustrated in FIGS. 4–6 the entire roller with all its five sections can be retracted into a vertical position with the aid of the hydraulic cylinder 21, the sections coming "on edge" in approximately the same vertical plane. To put the roller into its transport position from this intermediate position the tractor is driven slowly forwards. The sections 4–6, which are connected together in the same way as the three-section roller, are then swung inwards in the same way as described before in conjunction with FIG. 11. A further means has been added to the five-section roller illustrated, for swinging the outer sections 44 and 46 synchronously and simultaneously with sections 4 and 6 to the transport position simultaneously as sections 4 and 6 are swung to this position. This is achieved by a tension link 50 being pivotably connected by a pivoting pin 54 on the central frame 8. The pivoting pin is spaced from the pivoting pin 18 as will be seen from the FIGS. 16 and 17. At its outer end the link rod 50 is connected to a pivoting pin 53 by which one end of each of two toggle links 51 and 52 are pivotably connected.

When the roller is driven forwards and the side sections 4 and 6 swing towards each other, the link rod 50 will pull on the pivoting pin 53. In turn this results in that the toggle links 51 and 52 will be subjected to tension, whereby the outer section 46 will be swung forwards and assume the position illustrated in FIG. 16, when the tractor has driven a sufficient distance.

A linkage system, corresponding to the details 50–54 is arranged on the left hand side of the roller such that outer section 44 is swung into the transport position in the same way as the outer section 48 is activated.

It will be apparent from the description of the invention that an agricultural roller in accordance with the invention is very easy to handle. By operating means in the driver's cabin on the tractor, the cylinder 21 can be controlled such that the roller is changed over from its work position to its intermediate position without the tractor driver needing to leave the driver's seat. To swing out or swing in the rollers the driver only needs to drive slowly forwards or backwards while the roller is in its intermediate position.

The invention also affords one skilled in the art a series of different alternatives for structures within the scope of the claims. One such has been illustrated in FIGS. 12-14. The invention can also be applied to a five-section roller of this embodiment, as well as other types of agricultural equipment or transportable apparatus.

I claim:

1. An agricultural roller equipped with wheels and intended for soil cultivation, and including a plurality of frame sections pivotably connected to each other and arranged side by side, said frame sections comprising a central frame section having a towing bar pivotally connected thereto for transport and towing behind a tractor, and side frame sections pivotally connected on both sides of the central frame section, each of said frame sections having attached thereto a rotatable roller means for working the soil, characterized;

in that all wheels are attached to the side frame sections and are intended for transport only and are settable between an inactive position above the ground in the work position of the roller and a lowered position where the wheels carry the roller with the roller means lifted from the ground, said wheels including two transport wheels (15,16) connected one to each of the side frame sections in close proximity to the central frame section (8), in that said pivotal connections between adjacent frame sections (4,5,6) include pivoting joints (17, 18) having only one pivoting axis and formed and oriented such that the frame sections of the roller are free to swing vertically relative to each other while in the work position for the purpose of allowing the frame sections to adjust themselves to irregularities in the ground, and the side frame sections are allowed to swing inwardly while in the transport position so that a decreased transport width is obtained, in that a power means is arranged between the towing bar (5) of the roller and the central frame section (8) so that the central frame section and the side frame sections connected thereto are, by the action of the power means (21), commonly pivotable approximately 90 degrees about a pivoting axis transverse to the travelling direction of the roller between its work position and an intermediate position in which all the frame sections are situated generally parallel to each other and substantially in a vertical plane transverse to the travelling direction, while the transport wheels (15,16) are adapted such as to be simultaneously pivoted between their inactive position and a position engaging the ground for supporting the roller with the roller means elevated above the ground, and in that with the frame sections retracted into the intermediate position the pivoting joints allow the side frame sections (4, 6) to swing between the intermediate position and the transport position when the roller is moved forwards or backwards in the working direction thereof.

2. Apparatus as claimed in claim 1, characterized in that the pivot joints (17, 18) are formed such that the pivoting axis is in the direction of travel of the roller when the roller is in its work position.

3. Apparatus as claimed in claim 1, characterized in that the wheels (15, 16) are rotatable about shafts which are approximately vertical in the work position of the roller and rigidly connected to the side frame sections (4, 6) adjacent the central frame section.

4. Apparatus as claimed in claim 1, characterized in that the side frame sections (4, 6) have arms 19, 20) projecting out therefrom adjacent the pivot joints (17, 18), these arms being brought into engagement with and locked by locking arms (22, 23) arranged on the central frame section (8) in the transport position of the sections.

5. Apparatus as claimed in claim 1, characterized in that the side frame sections (4, 6) are interconnected to each other by a link rod (38), the ends of which are pivotally connected to points on the side frame sections (39, 40) situated at equal distances from the pivot joints (17, 18) of the side frame section, but on different sides thereof, whereby the side frame sections are caused to swing simultaneously between the intermediate position and the transport position.

6. Apparatus as claimed in claim 5, characterized in that on either side of the side frame sections (4, 6) the roller has an outer frame section (44, 46), and in that between the side frame sections and outer frame sections there are arranged pivot joints (47, 48) with pivoting axes parallel to those for the pivot joints (17, 18) between the central frame section and side frame sections.

7. Apparatus as claimed in claim 6, characterized in that a second link rod (50) is pivotably connected at one end on a pivot pin (54) disposed on the central frame (8) and spaced from one end thereof, while the other end of the link rod is pivotably connected to a pivot joint (53) between one end of each of two toggle links (51, 52), the other ends of the toggle links being pivotably connected to one of the side frame sections and to its adjacent outer frame section at a distance from the respective pivot joint therebetween.

* * * * *